(12) United States Patent
Lutz (10) Patent No.: US 9,433,897 B2
(45) Date of Patent: Sep. 6, 2016

(54) PROCESS FOR PRODUCING A DIFFUSION BARRIER LAYER AND PROCESS FOR PRODUCING AN EXHAUST GAS TREATMENT UNIT

(71) Applicant: EMITEC GESELLSCHAFT FUER EMISSIONSTECHNOLOGIE MBH, Lohmar (DE)

(72) Inventor: Dieter Lutz, Meiningen (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 78 days.

(21) Appl. No.: 14/291,133

(22) Filed: May 30, 2014

(65) Prior Publication Data

US 2014/0260219 A1    Sep. 18, 2014

Related U.S. Application Data

(63) Continuation of application No. PCT/EP2012/073634, filed on Nov. 26, 2012.

(30) Foreign Application Priority Data

Nov. 30, 2011   (DE) .................. 10 2011 119 740

(51) Int. Cl.
*F01N 3/00*    (2006.01)
*B32B 15/04*   (2006.01)
(Continued)

(52) U.S. Cl.
CPC ........... *B01D 53/92* (2013.01); *B01D 46/2422* (2013.01); *B01J 23/75* (2013.01); *B01J 23/755* (2013.01); *B01J 35/04* (2013.01); *B01J 37/0238* (2013.01); *C21D 8/04* (2013.01);
(Continued)

(58) Field of Classification Search
CPC .......... B01J 23/755; B01J 35/04; C23C 8/02
USPC ................ 427/229, 287, 376.1, 376.2, 376.4
See application file for complete search history.

(56) References Cited

U.S. PATENT DOCUMENTS 4,500,605 A    2/1985  Fister et al.
4,602,001 A    7/1986  Cyron
(Continued)

FOREIGN PATENT DOCUMENTS

CN    1206628 A     2/1999
DE    3415460 A1   10/1985
(Continued)

*Primary Examiner* — Kenneth Bomberg
*Assistant Examiner* — Anthony Ayala Delgado
(74) *Attorney, Agent, or Firm* — Laurence A. Greenberg; Werner H. Stemer; Ralph E. Locher (57) ABSTRACT

A process for producing a diffusion barrier or blocking layer includes providing aluminum oxide on a metal sheet formed of a base material including at least iron, chromium and aluminum. A process for producing an exhaust gas treatment unit includes providing a honeycomb body and a housing in which at least one of the honeycomb body or the housing is formed of the metal sheet and the metal sheet is formed of a base material including at least iron, chromium and aluminum. The metal sheet thus includes, at least in a subregion, a surface layer including at least aluminum oxide and a metal from the group including cobalt and nickel. An exhaust gas treatment unit and a motor vehicle are also provided.

9 Claims, 4 Drawing Sheets (51) Int. Cl.
*B01D 53/92* (2006.01)
*C23C 8/02* (2006.01)
*C23C 8/10* (2006.01)
*C23C 10/02* (2006.01)
*C23C 24/08* (2006.01)
*C23C 8/14* (2006.01)
*C21D 8/04* (2006.01)
*B01J 37/02* (2006.01)
*B01J 23/75* (2006.01)
*B01J 23/755* (2006.01)
*B01J 35/04* (2006.01)
*B01D 46/24* (2006.01)
*F01N 3/28* (2006.01)
*B01J 21/04* (2006.01)

(52) U.S. Cl.
CPC ............. *C23C 8/02* (2013.01); *C23C 8/10* (2013.01); *C23C 8/14* (2013.01); *C23C 10/02* (2013.01); *C23C 24/08* (2013.01); *B01J 21/04* (2013.01); *F01N 3/281* (2013.01); *F01N 2370/02* (2013.01); *F01N 2450/22* (2013.01)

(56) References Cited

U.S. PATENT DOCUMENTS

| | | | |
|---|---|---|---|
| 5,366,139 | A | 11/1994 | Jha et al. |
| 6,095,406 | A | 8/2000 | Maus et al. |
| 6,180,075 | B1 | 1/2001 | Lindner et al. |
| 6,190,470 | B1 | 2/2001 | Wieres et al. |
| 6,673,466 | B2 | 1/2004 | Bruck et al. |
| 7,108,168 | B2 | 9/2006 | Brück et al. |
| 7,563,414 | B2 | 7/2009 | Brück |
| 2002/0013225 | A1* | 1/2002 | Figueroa ............ B01J 23/75 502/302 |
| 2002/0092585 | A1* | 7/2002 | Savich ............ C23C 8/02 148/518 |
| 2010/0184590 | A1 | 7/2010 | Althoefer et al. |
| 2013/0095003 | A1 | 4/2013 | Lutz |

FOREIGN PATENT DOCUMENTS

| | | |
|---|---|---|
| DE | 19530853 A1 | 2/1997 |
| DE | 19536752 A1 | 4/1997 |
| DE | 69409886 T2 | 9/1998 |
| DE | 10018641 A1 | 10/2001 |
| DE | 10114328 A1 | 10/2002 |
| DE | 102007042618 A1 | 3/2009 |
| DE | 102008006039 A1 | 7/2009 |
| DE | 102010020450 A1 | 11/2011 |
| EP | 0870531 A1 | 10/1998 |
| RU | 2291767 C2 | 1/2007 |
| RU | 2333788 C2 | 9/2008 |
| WO | 02076614 A1 | 10/2002 |
| WO | 2011151185 A1 | 12/2011 |

* cited by examiner

PROCESS FOR PRODUCING A DIFFUSION BARRIER LAYER AND PROCESS FOR PRODUCING AN EXHAUST GAS TREATMENT UNIT

CROSS-REFERENCE TO RELATED APPLICATION

This is a continuation, under 35 U.S.C. §120, of copending International Application No. PCT/EP2012/073634, filed Nov. 26, 2012, which designated the United States; this application also claims the priority, under 35 U.S.C. §119, of German Patent Application DE 10 2011 119 740.4, filed Nov. 30, 2011; the prior applications are herewith incorporated by reference in their entirety.

BACKGROUND OF THE INVENTION

Field of the Invention

The present invention relates to a process for producing a diffusion barrier layer on a metal sheet, a process for producing an exhaust gas treatment unit, an exhaust gas treatment unit and a motor vehicle. The present invention is directed, in particular, at the technical field of exhaust gas technology for motor vehicles, with the metal sheet or the exhaust gas treatment unit being able to be used in an exhaust gas system of a motor vehicle.

Motor vehicles and commercial vehicles are subject to many exhaust gas regulations and adherence thereto is ensured by appropriately configured exhaust gas systems. Exhaust gas systems are known which have at least one exhaust gas treatment unit formed at least partly by a metallic honeycomb body. The metallic honeycomb body is, for example, used as a carrier or support body for catalytically active materials, for coatings for storing exhaust gas components and/or as particle precipitators. The exhaust gas treatment unit is normally at least partly coated for that purpose in order to influence or react various constituents of the exhaust gas at different places in the exhaust gas system of a motor vehicle or perform other functions for exhaust gas treatment.

Within an at least partly metallic honeycomb body of an exhaust gas treatment unit, brazed joins are produced as a result of a brazing process so that fixing of the individual components of the metallic honeycomb body to one another and/or to themselves and/or long-term positioning of the honeycomb body in a housing is achieved.

Such metallic honeycomb bodies and housings are, in particular, formed by a base material having the following properties:

Metal Foils of the Honeycomb Body
Microstructure: ferrite
Composition: FeCrAl alloy having a chromium content of at least 12% by weight and an aluminum content of at least 2.5% by weight. Additions of rare earths, Y and/or Hf for controlling formation of an $Al_2O_3$ surface layer are possible
Example of material: materials having the number 1.4767 or 1.4725 of the German steel classification
Thickness of material: 20 µm [micron] to 150 µm
Form: at least partly structured; smooth
Housing
Microstructure: austenite or ferrite
Thickness of material: 0.1 mm [millimeter] to 3 mm
Form: cylindrical; oval; conical Brazing Material:
Form: brazing powder; brazing ribbon
Composition: nickel-based brazing material, with chromium, phosphorus and silicon being present as main additives. Very particular preference is given to the proportions of the main additives decreasing in the following order: chromium, phosphorus, silicon. The chromium content of the nickel-based brazing material is preferably above the proportion of chromium in the material of the honeycomb body, for example in the range from 23 to 25% by weight. The main additives phosphorus and silicon should together not exceed the proportion of chromium.
Example of material: nickel-based brazing materials of this type are obtainable, for example, under the name Nicrobraz from Wall Colmonoy Ltd.

In the production of an exhaust gas treatment unit, it can be necessary or explicitly desired for brazed joints to be provided only at particular contact points between components of the exhaust gas treatment unit. As a result of those (only) locally restricted brazed joints in the honeycomb body and/or between the honeycomb body and the housing, flexibility of the exhaust gas treatment unit is retained. That flexibility leads to the exhaust gas treatment unit being able, despite the changing temperatures and pressures prevailing in the exhaust gas system, to achieve higher long-term strength when used in the exhaust gas line of a motor vehicle. The desired brazed joints can be produced, for example, by (targeted) introduction of brazing material only at particular contact points of the honeycomb body or the exhaust gas treatment unit. In that context, it is also possible to apply a passivation layer to predetermined regions of the exhaust gas treatment unit, so that undesired joints at contact points are prevented. An undesirable flow of brazing material and/or undesirable diffusion of alloy elements from the base material were taken into account in that case.

Even though some measures for the targeted formation of brazed joints and/or for avoiding undesirable other compounds (hereinafter referred to as secondary joints, diffusion joints) at contact points in the production of such exhaust gas treatment units which are joined by high-temperature brazing under vacuum or under protective gas have been proposed, there continues to be a need to simplify that process for mass production, make it safer, allow it to proceed more inexpensively and/or avoid further interfering influences for the brazing process.

SUMMARY OF THE INVENTION

It is accordingly an object of the invention to provide a process for producing a diffusion barrier layer, a process for producing an exhaust gas treatment unit, an exhaust gas treatment unit and a motor vehicle, which overcome the hereinafore-mentioned disadvantages and at least partly solve the highlighted technical problems of the heretofore-known processes, units and vehicles of this general type. In particular, a process for producing a diffusion barrier layer on a metal sheet, which allows particularly exact and defined formation of brazed joints and reduces the risk of later formation of undesirable diffusion joints to the metal sheet should be provided. Furthermore, a process for producing an exhaust gas treatment unit should be proposed, so that brazed joints are produced (only) at predetermined places on the exhaust gas treatment unit and undesirable diffusion joints in the exhaust gas treatment unit are avoided. In addition, an exhaust gas treatment unit should be specified in which the brazed joints are produced (only) at predetermined contact points and undesirable diffusion joints at further contact points can be avoided.

With the foregoing and other objects in view there is provided, in accordance with the invention, a process for producing a diffusion barrier layer including aluminum oxide on a metal sheet formed of a base material containing at least iron (Fe, atomic number 26), chromium (Cr, atomic number 24) and aluminum (Al, atomic number 13), the process comprising at least the following steps:

a) provision of the metal sheet, b) application of at least one metal oxide selected from the group consisting of cobalt oxide (in particular $Co_3O_4$, which is stable to 900° C.) and nickel oxide (in particular, NiO) or application of at least one material compound which as a result of a temperature increase can form at least one metal oxide selected from the group consisting of cobalt oxide and nickel oxide, to at least one subregion of a surface of the metal sheet as a surface layer, and c) carrying out of a heat treatment above 650° C. under vacuum or protective gas on the metal sheet having the surface layer so that a diffusion barrier layer including aluminum oxide is formed only in the at least one subregion of the surface layer. In this case, the aluminum oxide is produced (primarily) by reduction of the metal oxide to a metal and (simultaneous) oxidation of aluminum diffusing out of the base material to aluminum oxide.

The metal sheet is, in particular, a metal foil having a thickness in the range from 10 μm [microns] to 3 mm [millimeter]. When the metal sheet is used as a metal foil in the honeycomb body, the thickness of the metal sheet is very particularly preferably in the range from 30 μm to 120 μm; when the metal sheet is used as a housing, on the other hand, the thickness is, for example, from 0.5 mm to 2.2 mm. The metal sheet can also have structuring (e.g. corrugations, knobs, embossing, etc.) and/or openings. The metal sheet is optionally formed by fine, metallic wires (of the type of a nonwoven, knitted, woven fabric, etc.) which each have a diameter in the range from 5 μm to 100 μm and a length in the range from 30 μm to 10 mm.

Step b) of the process is carried out, in particular, by a dipcoating process or a deposition process or another suitable process for deposition or application. In this case, at least one metal oxide selected from the group consisting of cobalt oxide ($Co_3O_4$) and nickel oxide (in particular NiO) and/or at least one material compound which can thermally form such a metal oxide is applied to at least a subregion of a surface of the metal sheet as a surface layer. Preference is given to precisely one single type of metal oxide being applied to the predetermined metal sheet. The subregion of the surface can concern a (single) contiguous section of the surface or a plurality of/many (relatively small) sections. In addition, it is possible for the subregion to relate to only one side of the surface of the metal sheet. Very particular preference is given to at least 90% of or even the entire surface of the metal sheet being provided with the selected metal oxide and/or with the material compound. After step b), there is, in particular, a firm material bond between metal oxide and/or material compound and base material. In particular, a material compound which, e.g., as a result of a separate (preceding) heat treatment and/or as a result of the heat treatment in step c), forms cobalt oxide and/or nickel oxide is applied in step b) of the process. An example of such a material compound is a hydroxide of nickel and/or cobalt. This material compound could thus also be referred to as a type of metal oxide former or metal oxide precursor. In this case, it is particularly desirable for this conversion or formation of the metal oxides to be effected also under vacuum and/or protective gas.

In a step c), a heat treatment is carried out. In this case, the material compound is first, in particular, at least partially dissolved and/or decomposed as a result of the increase in temperature, so that at least one metal oxide from the group consisting of nickel oxide and cobalt oxide is now present.

The heat treatment in step c) can, in particular, readily be adapted by a person skilled in the art to the composition of the materials, in particular with respect to the selection of a suitable temperature. The temperature or the duration of the heat treatment can be adapted, e.g. elevated temperatures may allow a shorter heat treatment. As a result of the heating of the metal sheet, the aluminum present in the base material diffuses in the direction of the surface layer and penetrates into it. In the surface layer, the aluminum reacts, in particular, with the oxygen bound to the metal oxide to form aluminum oxide. This reaction occurs, in particular, according to the following reaction equation:

or

In particular, the aluminum oxide is accordingly firstly formed in the region of the surface of the metal sheet because the aluminum diffusing into the surface layer reacts in this case with the oxygen of the metal oxide present in the surface layer. Consequently, a diffusion barrier layer composed of aluminum oxide, which at least largely (completely) prevents diffusion of further elements, in particular of the base material, into the surface layer is formed on the surface of the metal sheet and in particularly (exclusively) in the surface layer. In particular, diffusion of elements, e.g. from the surface layer, into the base material is further likewise (completely) prevented.

After the carrying out of the heat treatment in step c), a diffusion barrier layer, in particular, including aluminum oxide is present in the surface layer. Furthermore, in particular, an elemental metal from the group consisting of cobalt and nickel is found there. Thus, in particular, a metallic surface layer which is, in particular, well-suited for the later formation of brazed joints is obtained after carrying out step c) of the process.

The metal oxide and/or the material compound in the surface layer serve, in particular, as carrier for the oxygen, so that the aluminum (from the base material) reacts (exclusively) with the oxygen provided in this way to form aluminum oxide.

The heat treatment in step c) is, in particular, carried out in a vacuum or under a protective gas atmosphere. In particular, no oxygen is introduced. The reaction during the heat treatment, which with the participation of oxygen leads to the formation of aluminum oxide, occurs, in particular, only with participation of oxygen which was bound to the metal oxide and/or to the material compound (and was present in the surface layer) in (at least) the surface layer even before the heat treatment.

Small amounts of oxygen may still be present during the heat treatment despite a vacuum or protective gas atmosphere. This "residual oxygen" is nevertheless insufficient to form a diffusion-impermeable configuration of an aluminum oxide layer on the surface of the metal sheets.

A person skilled in this field will be familiar with these alloying or transformation processes, so that such a person will readily be able to comprehend, imitate and control the chemical processes addressed herein. In addition, an illustrative example will be given below.

As an example of a suitable heat treatment, an ambient temperature above 1000° C. and a treatment time in the range from 10 minutes to 60 minutes in a vacuum atmosphere could be selected. Very particular preference is given to an ambient temperature which does not exceed 1200° C. It may be remarked herein that the heat treatment can also be carried out in a plurality of stages, so that, for example, a preheating phase of from 20 minutes to 60 minutes can be carried out at an ambient temperature below 1000° C., optionally at an ambient temperature above 400° C. or even above 800° C. Likewise, this can be followed by a cooling phase which extends, for example, over a period of from 15 minutes to 40 minutes. The heat treatment can, in particular, extend in total over a period of at least 2 hours, optionally even at least 3 hours.

In a preferred embodiment of the process, the metal oxide and/or the material compound is present in the surface layer in step b) in a proportion of at least 40% by weight. The metal oxide and/or the material compound is preferably present in this case in a proportion of at least 60% by weight and particularly preferably in a proportion of at least 80% by weight. In particular, the surface layer does not contain any iron (Fe) and/or does not contain any chromium (Cr). Preference is given to the surface layer not containing any aluminum (Al).

In an advantageous embodiment, the aluminum oxide is homogeneously distributed in the surface layer after step c) of the process has been carried out. In this context, "homogeneously" means, in particular, that the aluminum oxide is uniformly (over the thickness) distributed in the surface layer, in particular with a deviation of not more than 5% by weight. The deviation can, in particular, be determined by comparison of the proportions determined in % by weight in various measurement regions. These measurement regions encompass, in particular, in each case an area of from 50 to 400 nm$^2$, in particular 100 nm$^2$ [square nanometer], but are not in any way restricted to this size of the area.

In a further advantageous embodiment, the proportion of a metal of the metal oxide and/or the material compound present in elemental form in the surface layer has increased by at least 5% by weight, preferably by at least 10% by weight and particularly preferably by at least 20% by weight, after step c) has been carried out. In particular, this increase in the proportion of the metal which is now present in elemental form results (mainly) from the reaction of aluminum with the metal oxide and/or the material compound. The aluminum which has diffused from the base material into the surface layer thus takes the oxygen from the compound of the metal oxide and/or the material compound, so that elemental metal is formed in the surface layer. In particular, at least 80% by weight of the metal oxide and/or the material compound present in the surface layer before step c) is converted as a result of carrying out step c) into elemental metal. Preference is given to at least 90% by weight and very particularly preferably at least 99% by weight being converted.

In a further advantageous embodiment, the proportion of aluminum in the base material in step a) of the process is in the range from 1 to 7% by weight with, in particular, the proportion of aluminum in the surface layer in step b) of the process being not more than 2% by weight, preferably not more than 1% by weight and particularly preferably not more than 0.1% by weight.

In an advantageous embodiment, the proportion of aluminum in the diffusion barrier layer after step c) has been carried out is at least 15% by weight, preferably at least 20% by weight.

The diffusion barrier layer is, in particular, formed in a region of the surface layer or extending from a region between the surface layer and the base material which immediately after step c) has a proportion of aluminum of at least 15% by weight and preferably at least 20% by weight.

In particular, preference is given to an appropriate diffusion barrier layer being formed in the entire surface layer, i.e. in particular, the proportion of aluminum in the entire surface layer is, immediately after carrying out step c), at least 15% by weight, preferably at least 20% by weight.

In particular, aluminum is, after the heat treatment process according to step c), present in a proportion in % by weight in the entire region of the surface layer which exceeds the proportion in % by weight of aluminum present in the (total) base material of the metal sheet by at least a factor 2, preferably at least by a factor 3, and is at least 5% by weight.

In an advantageous embodiment, the surface layer has a thickness of not more than 1 μm [micron], in particular a thickness of not more than 0.5 μm, preferably not more than 0.25 μm and particularly preferably not more than 0.1 μm, after step b) has been carried out.

In particular, the thickness of the surface layer and the intensity (temperature and duration) of the heat treatment influence the formation of the diffusion barrier layer in the surface layer. In particular, provision of a particularly thin surface layer results in the diffusion barrier layer being formed homogeneously in the entire surface layer.

The formation of the diffusion barrier layer leads, in particular, to diffusion of elements other than aluminum from the base material into the surface layer being prevented. In particular, the diffusion barrier layer (largely) prevents diffusion of other elements into the base material.

In particular, a relatively thick surface layer and/or a less intensive heat treatment leads to the aluminum oxide being formed (only or predominantly) in the vicinity of the surface of the metal sheet in the surface layer, with a corresponding multilayer structure going out from the base material in the following order being formed: base material, diffusion barrier layer (with elemental metal of the metal oxide), metal oxide and/or material compound. In particular, the aluminum does not diffuse into the entire surface layer (in the direction of the thickness), so that the metal oxide is converted only partly into elemental metal.

In an advantageous embodiment of the process, the base material in step a) has a proportion of not more than 20% by weight of the metal of the metal oxide and/or the material compound from step b). In particular, the base material in step a) includes not more than 10% by weight, preferably not more than 5% by weight and particularly preferably not more than 1% by weight, of the metal of the metal oxide and/or the material compound from step b). In particular, the base material in step a) includes 0% by weight of the metal of the metal oxide and/or the material compound from step b).

In particular, the proportion of the metal of the metal oxide in the surface layer does not increase due to diffusion of the metal from the base material into the surface layer as a result of the heat treatment in step c). This increase in the proportion of the metal occurs (exclusively) by reduction of the metal oxide to the elemental metal with simultaneous formation of aluminum oxide by oxidation of the aluminum diffusing into the surface layer.

With the objects of the invention in view, there is also provided a process for producing an exhaust gas treatment unit, wherein the exhaust gas treatment unit has a honeycomb body and a housing and at least the honeycomb body or the housing is formed with a metal sheet. In particular, what has been said above with respect to the metal sheet applies analogously to the process proposed herein. The metal sheet is formed of a base material containing a least iron (Fe), chromium (Cr) and aluminum (Al).

The process comprises at least the following steps:
i) provision of at least one metal sheet to form a housing or a honeycomb body,
ii) application of at least one metal oxide selected from the group consisting of cobalt oxide and nickel oxide or application of at least one material compound which as a result of a temperature increase can form at least one metal oxide selected from the group consisting of cobalt oxide and nickel oxide, to at least a subregion of a surface of the at least one metal sheet as a surface layer,
iii) formation of a honeycomb body and insertion of the honeycomb body into a housing,
iv) application of brazing material to at least the honeycomb body or the housing in at least one brazing section,
v) carrying out a brazing process above 1000° C. on the at least one metal sheet including metal oxide under vacuum or protective gas, so that:
a diffusion barrier layer including aluminum oxide is formed only in the at least one subregion in the surface layer, with reduction of the metal oxide to a metal and oxidation of the aluminum diffusing out of the base material to aluminum oxide and
a brazed joint is formed on the at least one metal sheet in the at least one brazing section.

What has been said above with respect to steps a) and b) applies, in particular, to the steps i) and ii) of the process proposed herein.

The proposed steps i) to v) of the process proceed, in particular, in succession in the order proposed herein. However, step iv) particularly occurs before or simultaneously with step iii).

In particular, the metal sheet proposed herein for the exhaust gas treatment unit is a high-temperature-resistant metal sheet which is, in particular, suitable for withstanding the temperature changes and dynamic requirements and also the corrosive environment in the exhaust gas system of a motor vehicle in the long term. In this case, temperatures above 800° C. and/or considerable pressure pulses resulting from the combustion processes in the internal combustion engine of the motor vehicle can act on the exhaust gas treatment unit.

With regard to the base material, preference is given to using an iron material which additionally includes chromium and aluminum as main alloying elements. The proportion of chromium is, in particular, a factor of at least 3 greater than the proportion of aluminum. Very particular preference is given to the proportion of chromium being, for example, in the range from 12 to 25% by weight while the proportion of aluminum is, for example, in the range from 1 to 7% by weight and preferably in the range from 2.5 to 6% by weight. In addition, it is possible to use base materials as have been described with respect to the metal foil described at the outset and/or the housing, with the description being fully incorporated by reference.

The surface layer preferably covers (only) the subregions of the metal sheet which, after configuration of the metal sheet to form an exhaust gas treatment unit, form contact points with other components of the exhaust gas treatment unit. In particular, the surface layer covers only the contact points at which neither a brazed joint nor a diffusion joint is desired, so that no bonding of the components of the exhaust gas treatment unit forming the points which are in contact with one another occurs. However, it is also possible for a surface layer to be applied to subregions or to the entire surface of the metal sheet, so that brazed joints can subsequently be disposed thereon. The surface layer should in itself be closed, i.e., in particular, form no significant pores through to the base material of the metal sheet. In particular, the surface layer is not configured as a catalyst layer, in particular not for the reaction of pollutants in an exhaust gas.

The surface layer results in the elements chromium and iron (as main constituent of the base material of the metal sheet) firstly no longer being present at a contact point. It is known that chromium and iron both have a very high affinity to carbon and when this is available under brazing conditions chromium carbide formation (iron-chromium carbide formation) inevitably occurs. Cobalt and nickel, on the other hand, do not form corresponding carbides. Cobalt and nickel are completely miscible with chromium and iron but themselves have no (appreciable) catalytic function which can be utilized in this case for exhaust gas treatment.

Firmly adhering chromium carbide bridges (secondary joint, diffusion joint) are formed at the contact areas of the metal sheet with other components of the exhaust gas treatment unit or with themselves during the brazing process as a function of local carbon availability. Under unfavorable circumstances, a three-dimensionally finely distributed carbide skeleton is formed in this way. This carbide skeleton joints/welds together the metal sheet firmly to itself and/or other components of the exhaust gas treatment unit and thus influences the flexibility of the configuration of the metal sheet, e.g. in an exhaust gas treatment unit, i.e. the flexibility of the exhaust gas treatment unit itself. Application of a surface layer which separates off the chromium and the iron thus interrupts or inhibits the mechanism of chromium carbide formation. This is explained below.

In particular, the provision of the metal oxide in the surface layer provides (in particularly exclusively) the oxygen necessary for producing the high-temperature-resistant and corrosion-resistant aluminum oxide layer. Thus, the protective aluminum oxide layer can be formed on the metal sheet as early as during the brazing process (which is, in particular, carried out under protective gas or under vacuum, i.e. without oxygen). Thus, in particular, an additional subsequent oxidation process for the exhaust gas treatment unit is dispensed with. A corresponding aluminum oxide layer is usually produced on the exhaust gas treatment unit by using this oxidation process by treating the exhaust gas treatment unit at temperatures of at least 400° C. in an oxygen-containing atmosphere.

In particular, the provision of the metal oxide in the surface layer results in an appropriate aluminum oxide layer being provided (only) at predetermined subregions of the metal sheet or of the exhaust gas treatment unit as early as during the brazing process. Furthermore, the conversion of the metal oxide into the elemental metal in the surface layer results in the surface layer acquiring metallic properties, so that brazing ability of these regions of the surface layer is maintained. The formation of spinels, in particular, from the metal oxide in the surface layer is thus prevented, so that the metallic properties of the surface layer are advantageously retained.

The components to be brazed, e.g. metal foils and housing, can have residues of carbon-containing liquids, e.g. rolling oil or corrugating oil. Due to capillary effects, those liquids are drawn back into the wedge-like contact area, e.g. between corrugated and smooth layers of a honeycomb body, and thus wet those components. After introduction into the brazing unit, evacuation or introduction of a protective gas commences. At the same time, the temperature is increased. Combustion of the liquids after reaching the flash point is no longer possible because of the lack of oxygen, so that a cracking process commences at about 400° C. upward and results in the formation of pure, highly reactive carbon. That cracking process also takes place during production of the brazed joints under protective gas, since in that case too the oxygen is displaced and carbon-containing manufacturing auxiliaries are cracked. The carbon withdraws the chromium from the components and permanently joints juxtaposed surfaces (forming contact points) of components through carbide bridges with formation of chromium carbides or iron-chromium carbides. That carbide bridge formation can no longer be undone even at the customary brazing temperatures of above 1,050° C. In addition, the alloy of the base material of the component then has a chromium deficit.

In the critical temperature range from about 400° C. to 800° C., in which the chromium carbides are formed, the aluminum diffuses from the base material into the surface layer. The aluminum then reacts with the metal oxide from the group consisting of cobalt oxide and nickel oxide in the surface layer or at the surface of the metal sheet. There, aluminum oxide is formed and the metal oxide is reduced back to the elemental metal. The formation of the aluminum oxide layer in that region produces a diffusion barrier layer so that the alloy constituent chromium and also the iron cannot diffuse out from the base material of the metal sheet and into the surface layer. The alloy constituent chromium and the iron are held back in the metal sheet by the diffusion barrier layer and/or covered thereby so that chromium carbide bridge formation in the subregion at the contact points with adjacent components is prevented.

In a particularly advantageous embodiment of the invention, the aluminum has, after that temperature range has been exceeded, become distributed in the surface layer to such an extent that the total surface layer now forms a diffusion barrier layer. Due to the surface layer, the protective aluminum oxide layer has been produced on the metal sheet during the brazing process, i.e., in particular, without provision of additional oxygen from an appropriate atmosphere. The actual brazing process (in this case technically equivalent to brazing) occurs after a further temperature increase at temperatures of above 900° C.

The applied surface layer prevents, in particular, direct contact of carbon with the elements chromium and iron of the base material of the metal sheet. Any undesired bonding between the surfaces of adjacent components therefore does not occur. Correspondingly, it is possible to produce an exhaust gas treatment unit in which the joints between the components are formed only at the desired contact points, which are provided with brazing material, of the surfaces. It is thus possible, for example, to prevent different coefficients of expansion of the individual components of an exhaust gas treatment unit from leading to failure of the joint between these components as a result of locally different length changes. They can be compensated by components which have partially free mobility relative to one another. Furthermore, the oscillation behavior of the components of the exhaust gas treatment unit can be set exactly.

In a particularly advantageous embodiment of the process, another coating process in which an exhaust gas treatment layer is applied which completely covers the surface layer in at least one subregion is carried out after step v). This exhaust gas treatment layer serves, in particular, for the (exclusive) treatment of the exhaust gases conveyed through the exhaust gas treatment unit. Accordingly, the applied surface layer makes no (appreciable) contribution to the conversion of pollutants in the exhaust gas.

With the objects of the invention in view, there is furthermore provided an exhaust gas treatment unit produced, in particular, by the process of the invention and/or having at least one metal sheet produced by the process of the invention for producing a diffusion barrier layer.

The exhaust gas treatment unit comprises at least one honeycomb body and housing, with at least the honeycomb body or the housing being formed by at least one metal sheet. The metal sheet is formed of a base material containing at least iron (Fe), chromium (Cr) and aluminum (Al). The metal sheet has a surface layer including at least aluminum oxide and a metal from the group consisting of cobalt (Co) and nickel (Ni) in at least one subregion. At least in the subregion, an exhaust gas treatment layer completely covers the surface layer. Furthermore, a brazed joint is formed on the metal sheet at least in the subregion in at least one brazing section.

In particular, what has been said with respect to the process of the invention applies fully to the exhaust gas treatment unit according to the invention mentioned herein.

With the objects of the invention in view, there is concomitantly provided a motor vehicle comprising at least one internal combustion engine, an exhaust gas line and an exhaust gas treatment unit according to the invention. In particular, the exhaust gas treatment unit has been produced by the process of the invention or has at least one metal sheet produced by the process of the invention for producing a diffusion barrier layer.

The surface layer forming or including at least cobalt oxide and/or nickel oxide which has been applied serves in this case, in particular exclusively, to provide oxygen for forming a diffusion barrier layer composed of aluminum oxide and for suppressing chromium carbide bridges at the contact points. In particular, it is also provided for forming, e.g. by oxide formation, a catalytically active substance for exhaust gas purification. In the exhaust gas treatment unit described herein, this is instead achieved by provision of an exhaust gas treatment layer which has been applied (at least partly) to the surface layer and optionally has appropriate catalytic activity and/or is equipped with appropriate properties (conversion, incorporation, storage of exhaust gas constituents). It is thus particularly desirable for the surface layer not to be in contact with the exhaust gas even during use. Such contact with the exhaust gas can, in particular, be avoided by the 2-layer coating (surface layer/diffusion barrier layer and exhaust gas treatment layer) when the surface layer is positioned (only) between the base material of the component and the exhaust gas treatment layer and/or between the base materials of adjacent components and/or the base material and the brazing material.

In a particularly advantageous embodiment, the exhaust gas treatment layer ensures that at least cobalt and/or nickel in the surface layer is (substantially) inert to an exhaust gas. In other words, this means that, for example, the elements cobalt and nickel and/or cobalt compounds and nickel compounds (e.g. cobalt/nickel oxides) in the surface layer are not catalytically active with respect to an exhaust gas when used in the exhaust gas treatment unit. The elements cobalt and nickel in this case serve (substantially) exclusively to avoid chromium carbide bridges between adjacent components which are in contact with one another and for providing oxygen for formation of the diffusion barrier layer. Thus, the exhaust gas treatment layer (also) has the function of reducing any catalytic activity of cobalt and nickel and of cobalt compounds and nickel compounds with respect to constituents of the exhaust gas to such an extent that there is at most negligible promotion of exhaust gas conversion or it does not occur at all.

In particular, in the case of other exhaust gas treatment layers, it cannot (e.g. due to diffusion processes) be ensured that the exhaust gas treatment layer completely covers the surface layer against an exhaust gas during use of the exhaust gas treatment unit so that absolutely no catalytic activity of cobalt and nickel or of cobalt compounds and nickel compounds occurs. However, the present invention can also encompass these other exhaust gas treatment layers when the exhaust gas treatment layer (virtually exclusively) performs the catalytic function of the exhaust gas treatment unit and the surface layer is correspondingly provided (virtually exclusively) for avoiding chromium carbide bridges and for providing oxygen for formation of a diffusion barrier layer.

It is particularly advantageous for the exhaust gas treatment layer to cover the surface layer (virtually) completely and be sufficiently gastight for the surface layer not to be in contact with an exhaust gas during use of the exhaust gas treatment unit. In this case, "gastight" means, in particular, that constituents of the exhaust gas cannot penetrate through the coating to the surface layer, so that a catalytic reaction between the surface layer, in particular with cobalt and nickel and cobalt compounds and nickel compounds, and constituents of the exhaust gas does not occur (to an appreciable extent).

In a further advantageous embodiment, the exhaust gas treatment layer of the exhaust gas treatment unit includes at least a washcoat. A washcoat typically includes at least one refractory oxide support or carrier, e.g. activated aluminum oxide ($Al_2O_3$), and one or more platinum group metal components, e.g. platinum, palladium, rhodium, ruthenium and/or iridium. Further additives such as promoters and washcoat stabilizers are often added. The washcoat provides, in particular, a particularly large contact area for the exhaust gas. This washcoat is, in particular, applied (at least partly) as an exhaust gas treatment layer to the exhaust gas treatment unit only after assembly to form an exhaust gas treatment unit, i.e. after formation of the brazed joints by a brazing process under vacuum or protective gas.

At this juncture it will be pointed out once again that what has been said with respect to the individual subjects of the present invention can in each case be applied to the other subjects and be combined with one another.

Working Example for Production of a Diffusion Barrier Layer:

Step a)
Material of the base material: material 1.4725
Sheet thickness of the metal sheet: 50 µm [micron]
Step b)
Material of the metal oxide: cobalt oxide
Thickness of the surface layer: 0.5 µm
Application method: PVD process
Step c)
Type/environment of the heat treatment: argon protective gas
Temperature profile of the heat treatment: heating to 800° C. and holding for 1.5 hours
Duration of the heat treatment: 3 hours total
Result:
Extent of the diffusion barrier layer: from 0.1 to 1 µm Other features which are considered as characteristic for the invention are set forth in the appended claims, noting that the individual features set forth in the claims can be combined with one another in any technologically meaningful way and can be supplemented by explanatory matter from the description, yielding further embodiments of the invention. In particular, features which are directed at the process for producing a diffusion barrier layer on a metal sheet, at the process for producing an exhaust gas treatment unit or at the exhaust gas treatment unit can be combined with one another or applied to the respective other subjects of the invention.

Although the invention is illustrated and described herein as embodied in a process for producing a diffusion barrier layer, a process for producing an exhaust gas treatment unit, an exhaust gas treatment unit and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
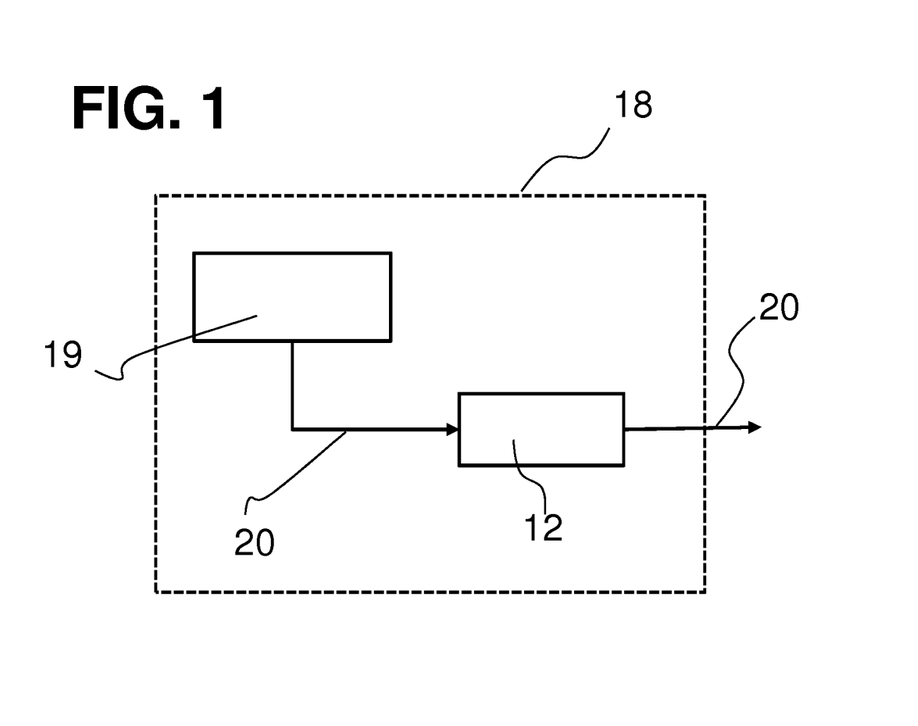
FIG. 1 is a block diagram of a motor vehicle having an exhaust gas treatment unit.

Referring now in detail to the figures of the drawing for explaining the invention and the technical field in more detail by showing particularly preferred structural variants to which the invention is not restricted, and first, particularly, to FIG. 1 thereof, there is seen a motor vehicle 18 having an internal combustion engine 19 and an exhaust gas treatment unit 12 which is disposed in an exhaust gas line 20 of the internal combustion engine 19.

Figure 2:
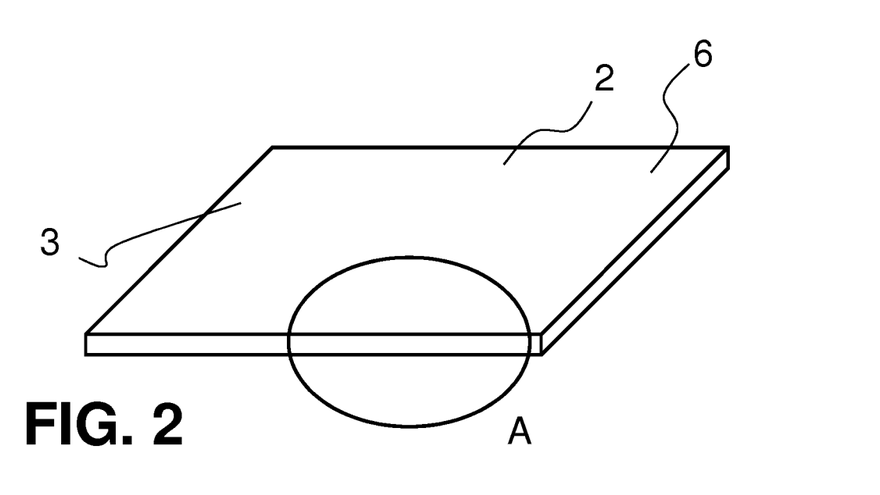
FIG. 2 is a diagrammatic, perspective view of a metal sheet according to process step a) or i)

FIG. 2 shows a metal sheet 2 according to process step a) or i). The metal sheet 2 has a surface 6 and is formed of a base material 3. Furthermore, the figure shows a section A which is illustrated in FIG. 3.

Figure 3:
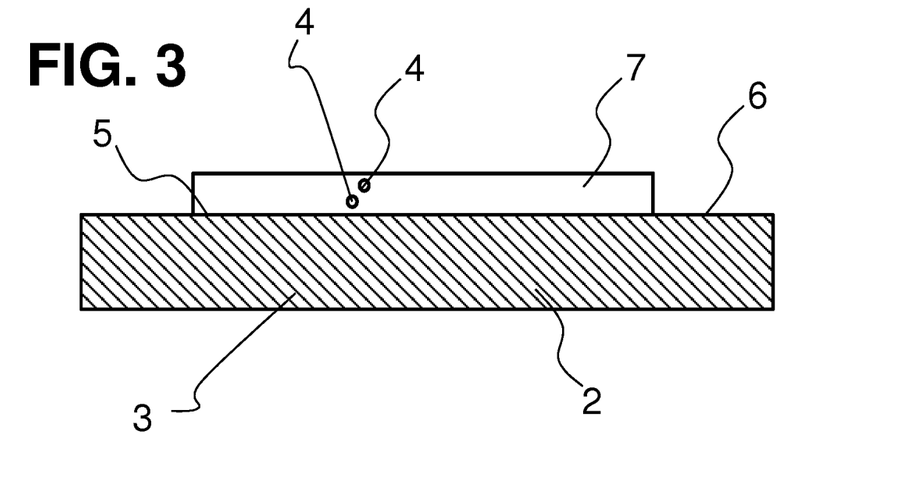
FIG. 3 is a cross-sectional view of a metal sheet according to process step b) or ii)

FIG. 3 shows the metal sheet 2 after process step b) or ii). The metal sheet 2 is formed of the base material 3 and is provided with a surface layer 7 in a subregion 5. The surface layer 7 is disposed on the surface 6 of the metal sheet 2. The surface layer 7 includes a metal oxide 4.

Figure 4:
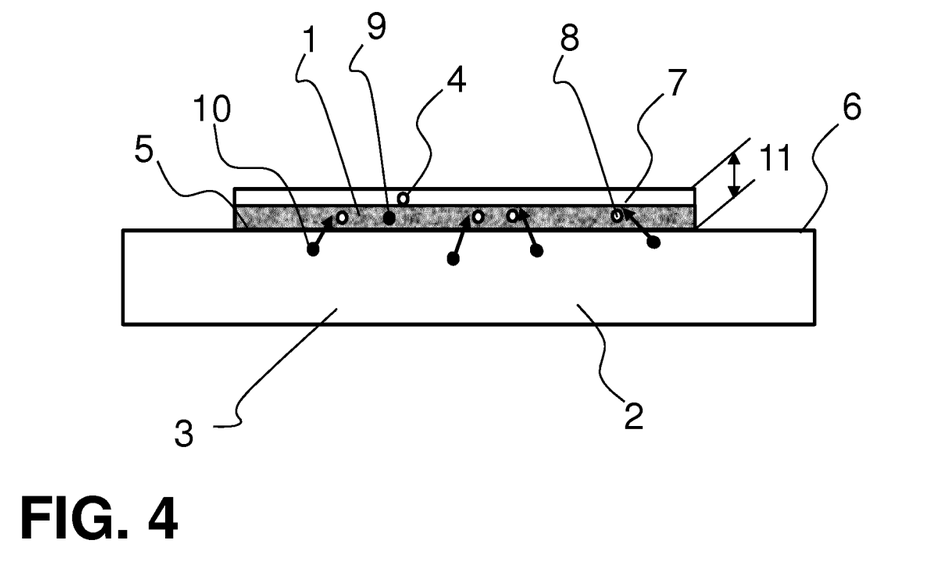
FIG. 4 is an elevational view of a metal sheet according to process step c) or v)

FIG. 4 shows the metal sheet 2 after process step c) or after process step v). As a result of the heat treatment in process step c) or v), aluminum 10 diffuses from the base material 3 into the surface layer 7. Aluminum oxide 8 is formed in the vicinity of the surface 6 in the region of the surface layer 7 in the subregion 5 of the metal sheet 2 by using the oxygen of the metal oxide 4. The metal oxide 4 thus serves as a carrier for the oxygen required in this case for the conversion of aluminum 10 into aluminum oxide 8. The surface layer 7 has a thickness 11. A diffusion barrier layer 1 extending in the surface layer 7 from the surface 6 in the direction of the surface layer 7 is formed as a function of the conditions (temperature, time) of the heat treatment. This diffusion barrier layer 1 is formed by the aluminum oxide 8. The conversion of aluminum 10 into aluminum oxide 8 by the oxygen of the metal oxide 4 results in a conversion of this metal oxide 4 into an elemental metal 9. Correspondingly, a multilayer structure formed of the base material 3, the diffusion barrier layer 1 (having an increased proportion of the elemental metal 9) and a part of the surface layer 7 having an increased proportion of the metal oxide 4 is formed in this case, at least part of the time, because the aluminum 10 from the base material 3 is not immediately available for formation of the diffusion barrier layer 1 in the surface layer 7.

Figure 5:
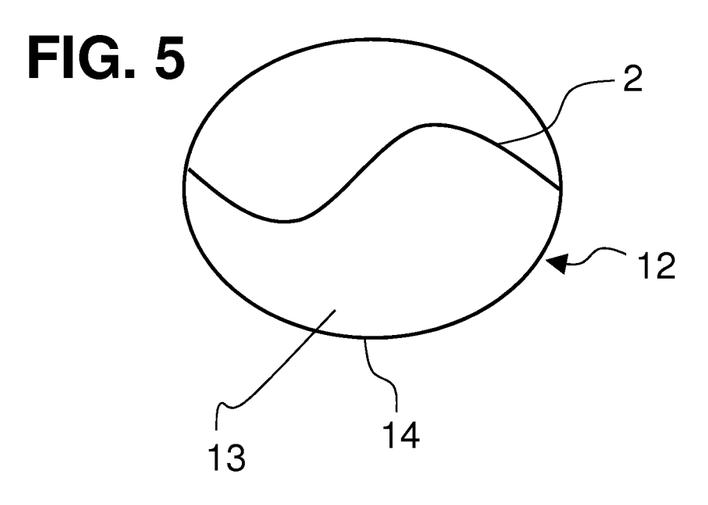
FIG. 5 is a cross-sectional view of an exhaust gas treatment unit according to process step iii)

FIG. 5 shows an exhaust gas treatment unit 12 according to step iii), with a honeycomb body 13 being produced in this case and the honeycomb body 13 being inserted into a housing 14. A metal sheet 2 is disposed in the honeycomb body 13. The honeycomb body 13 creates a structure through which an exhaust gas can flow and which can be used as the exhaust gas treatment unit 12 in the exhaust gas line 20 of the motor vehicle 18.

Figure 6:
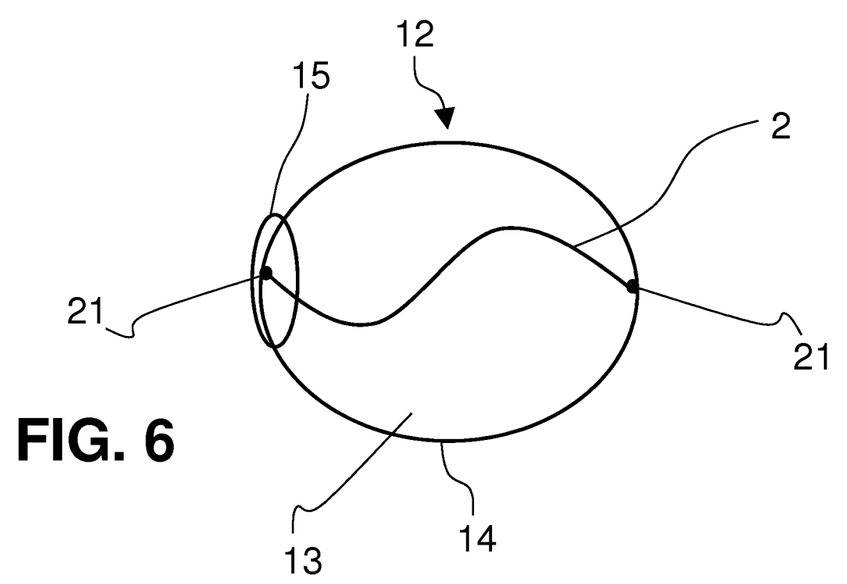
FIG. 6 is a cross-sectional view of an exhaust gas treatment unit according to process step iv)

FIG. 6 shows the exhaust gas treatment unit 12 according to step iv) of the process. In this case, a brazing material 21 is disposed in a brazing section 15 of the honeycomb body 13 and the housing 14. The brazing material 21 is disposed at least on the metal sheet 2.

Figure 7:
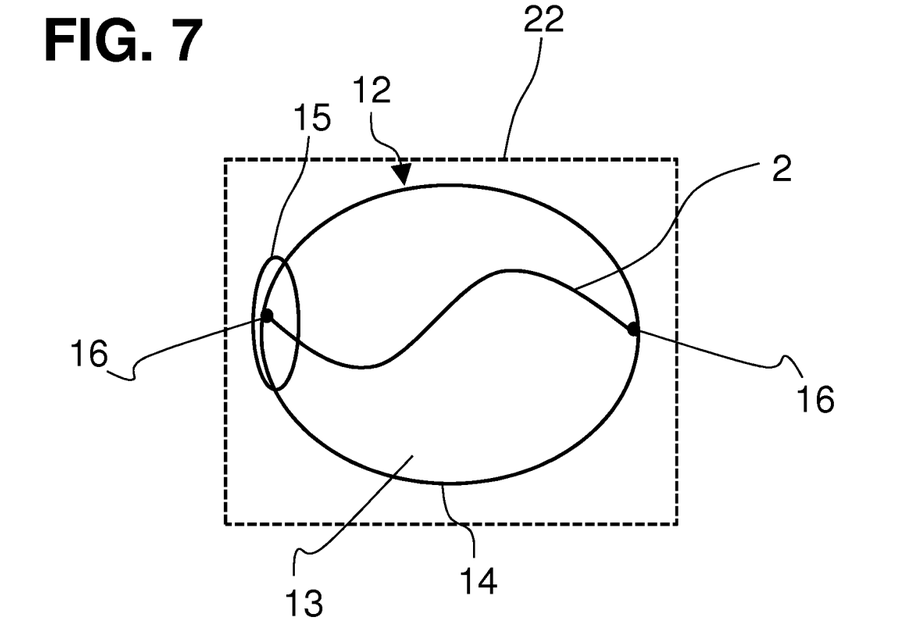
FIG. 7 is a cross-sectional view of an exhaust gas treatment unit according to process step v)

FIG. 7 shows the exhaust gas treatment unit according to process step v). The honeycomb body 13 and the housing 14 are disposed in a heat treatment apparatus 22 for carrying out the brazing process. The metal sheet 2 at least partly forms the honeycomb body 13. As a result of the brazing process, brazed joints 16 are formed at least in the brazing section 15.

Figure 8:
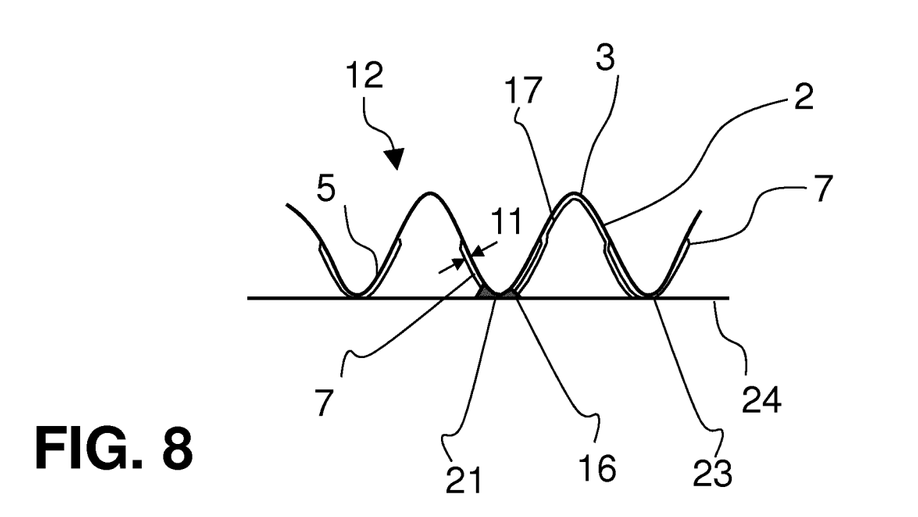
FIG. 8 is a fragmentary, sectional view of an exhaust gas treatment unit according to process step v).

FIG. 8 shows the exhaust gas treatment unit 12 after process step v). The metal sheet 2 has, at least in subregions 5, a surface layer 7 having a thickness 11. The surface layer 7 is at least partly covered by an exhaust gas treatment layer 17. In a region of contact points 23, the surface layer 7 is disposed in such a way that no diffusion joint between the metal sheet 2 and another component 24 of the exhaust gas treatment unit 12 is formed. The surface layer 7 is likewise formed at the brazed joint 16. The brazed joint 16 is formed between the metal sheet 2 and the component 24 by brazing material 21 after carrying out the brazing process.

The invention claimed is:

1. A process for producing a diffusion barrier layer including aluminum oxide on a metal sheet formed of a base material containing at least iron, chromium and aluminum, the process comprising the following steps:
 a) providing the metal sheet with a surface having at least one subregion;
 b) applying at least one metal oxide selected from the group consisting of cobalt oxide and nickel oxide, to the at least one subregion as a surface layer, or applying at least one material compound able to form at least one metal oxide selected from the group consisting of cobalt oxide and nickel oxide as a result of a temperature increase, to the at least one subregion as a surface layer,
 the metal oxide or the material compound in the surface layer in step b) being present in a proportion of at least 40% by weight; and
 c) carrying out a heat treatment above 650° C. on the metal sheet having the surface layer causing formation of a diffusion barrier layer including aluminum oxide only in the at least one subregion of the surface layer, with reduction of the metal oxide to a metal and oxidation of aluminum diffusing out of the base material to aluminum oxide.

2. The process according to claim 1, wherein the aluminum oxide is homogeneously distributed in the surface layer after carrying out step c).

3. The process according to claim 1, wherein a proportion of the metal of the metal oxide or of the material compound being present in elemental form in the surface layer has increased by least 5% by weight after carrying out step c).

4. The process according to claim 1, wherein a proportion of aluminum in the base material in step a) is in a range from 1 to 7% by weight and a proportion of aluminum in the metal oxide or in the material compound in step b) is at most 2% by weight.

5. The process according to claim 4, wherein a proportion of aluminum in the diffusion barrier layer after carrying out step c) is at least 15% by weight.

6. The process according to claim 1, wherein the surface layer has a thickness of at most 1 μm [micron] after carrying out step b).

7. The process according to claim 1, wherein the base material in step a) has a maximum of 20% of the metal of the metal oxide or the material compound from step b).

8. A process for producing an exhaust gas treatment unit, the process comprising the following steps:
 i) providing at least one metal sheet formed of a base material containing at least iron, chromium and aluminum for the formation of at least a housing or a honeycomb body from the at least one metal sheet and providing the at least one metal sheet with a surface having a subregion;
 ii) applying at least one metal oxide selected from the group consisting of cobalt oxide and nickel oxide, at least to the subregion as a surface layer, or applying at least one material compound able to form at least one metal oxide selected from the group consisting of cobalt oxide and nickel oxide as a result of a temperature increase, at least to the subregion as a surface layer;
 iii) forming the honeycomb body and inserting the honeycomb body into the housing;
 iv) applying brazing material at least to the honeycomb body or the housing in at least one brazing section;
 v) carrying out a brazing process above 1000° C. on the at least one metal sheet including metal oxide under vacuum or protective gas, causing:
 formation of a diffusion barrier layer including aluminum oxide only in the at least one subregion in the surface layer, with reduction of the metal oxide to a metal and oxidation of the aluminum diffusing out of the base material to aluminum oxide, and formation of a brazed joint on the at least one metal sheet in the at least one brazing section.

9. The process according to claim 8, which further comprises, after step v), carrying out a further coating process applying an exhaust gas treatment layer completely covering the surface layer in the at least one subregion.

* * * * *